United States Patent [19]

Evani et al.

[11] 4,105,649
[45] Aug. 8, 1978

[54] AQUEOUS POLYMERIC THICKENING AGENTS

[75] Inventors: Syamalarao Evani; Frederick P. Corson, both of Midland, Mich.

[73] Assignee: The Dow Chemical Company, Midland, Mich.

[21] Appl. No.: 512,780

[22] Filed: Oct. 7, 1974

Related U.S. Application Data

[62] Division of Ser. No. 267,570, Jun. 29, 1972, Pat. No. 4,008,202.

[51] Int. Cl.² .................. C08F 222/08; C08F 220/06; C08F 228/04
[52] U.S. Cl. ........................... 526/271; 260/29.6 RW; 260/29.2 N; 528/86; 526/208; 526/271; 526/304; 526/312; 526/317; 526/318; 526/289; 526/287; 526/320
[58] Field of Search ..................... 260/79.7, 79.3 MU; 526/304, 317, 318, 312, 271

[56] References Cited

U.S. PATENT DOCUMENTS

| 3,190,925 | 6/1965 | Stowe | 260/611 B |
| 3,652,497 | 3/1972 | Junas | 260/47 UA |
| 3,708,445 | 1/1973 | Junas | 260/4 R |

Primary Examiner—Christopher A. Henderson, Jr.

[57] ABSTRACT

A novel polymer of a vinyl benzyl ether monomer and at least one other copolymerizable monomer, at least one of which other monomers has a carboxylic acid group, an anhydride group, a sulfate group, a sulfonate group or a hydroxyl group is disclosed. The vinyl benzyl ether monomer has the formula

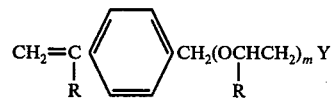

wherein R is hydrogen or methyl, m is about 10 to 100 and Y is $-OR_1$, $-SR_1$,

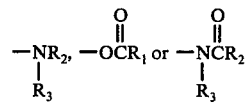

where $R_1$ is an alkyl, aralkyl or alkaryl hydrophobic group of 10 to about 22 carbon atoms, $R_2$ is an alkyl group of 1 to about 22 carbon atoms and $R_3$ is hydrogen or an alkyl group of 1 to about 22 carbon atoms, provided $R_2$ and $R_3$ in combination have at least 10 carbon atoms.

8 Claims, No Drawings

AQUEOUS POLYMERIC THICKENING AGENTS

CROSS-REFERENCE TO RELATED APPLICATION

This is a division, of application Ser. No. 267,570 filed June 29, 1972, now U.S. Pat. No. 4,008,202.

BACKGROUND OF THE INVENTION

Polymeric water soluble thickening agents are widely used for many purposes and many such agents of different chemical types are commercially available. The diversity of available products is an indicator that they are not all equally useful. It is not unusual to find some thickening agents which perform well in a certain environment and not at all in another environment. In fact, in some uses no one thickening agent is completely satisfactory and there is a continual need and a continuing search for new thickening agents to satisfy many of the unmet needs. Latex paint thickening is a good example, where the market is actively seeking an agent which will provide stable thickening as well as other properties such as flow and leveling.

U.S. Pat. Nos. 2,921,930 and 3,301,829 propose to make thickening agents by esterification of anhydride containing polymers. While certain of these polymeric esters provide thickening power, the viscosity of the aqueous system is not stable to storage. U.S. Pat. No. 3,499,876 proposes to make water soluble thickening agents from certain monomers. While no information is available therein to judge storage stability, a principal problem is the limited range of monomers which can be copolymerized together.

It is an object of this invention to provide aqueous storage stable thickening agents which may be prepared from a variety of monomers.

SUMMARY OF THE INVENTION

Essential to the preparation of the copolymers of this invention is a vinyl benzyl ether monomer having the formula

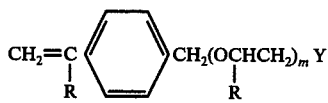

wherein R is hydrogen or methyl, $m$ is about 10 to 100 and Y is $-OR_1$, $-SR_1$,

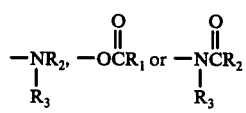

where $R_1$ is an alkyl, aralkyl or alkaryl hydrophobic group of 10 to about 22 carbon atoms, $R_2$ is an alkyl group of 1 to about 22 carbon atoms and $R_3$ is hydrogen or an alkyl group of 1 to about 22 carbon atoms, provided $R_2$ and $R_3$ in combination have at least 10 carbon atoms.

Copolymers are prepared to contain in polymerized form about 0.2 to 15 mole percent of said vinyl benzyl ether and the balance to make 100 percent of at least one other copolymerizable monomer provided that a water solubilizing amount of one or more monomers having a carboxylic acid group, an anhydride group, a sulfate group, a sulfonate group or a hydroxyl group is employed in the preparation of the compolymer.

DESCRIPTION OF THE INVENTION

The copolymers of this invention require certain amounts of the vinyl benzyl ether monomer to impart the beneficial thickening effect and a water solubilizing amount of a monomer having water solubilizing groups. Optionally the copolymers can be prepared to contain most any other copolymerizable monomer or mixture of same provided the two required types of monomers are employed.

By water solubilizing groups it is meant to include groups which provide the copolymer with sufficient hydrophilic properties as to be directly soluble in water or soluble in water as a neutralized salt of a base such as ammonia, alkali metal bases (NaOH, LiOH, KOH, $NaHCO_3$, $K_2CO_3$ and the like), alkyl amines and the like. Said groups include carboxylic acids, anhydrides, sulfates, sulfonates and hydroxyl. Carboxylic acids, sulfates and sulfonates readily form salts of the above bases. Anhydrides readily hydrolyze in water to the dicarboxylic acid which may be neutralized with said bases. In addition, anhydrides react with ammonia to form the half amide/half acid which can be further neutralized with ammonia to the half amide/half ammonium salt or with any of the above bases. Mono-primary and -secondary amines react similarly to ammonia. Tertiary monoamines may also be used to hydrolyze and neutralize the anhydride group except that a half amide will not be formed. Generally, polyfunctional amines should be avoided since crosslinking may result with the anhydride group, but in certain instances polyfunctional amines may provide beneficial properties especially if used in small amounts in conjunction with another of said bases.

By water solubilizing amount of said monomer it is meant at least the minimum amount necessary to make the copolymer water soluble or readily dispersible in an aqueous system. The specific amount will vary quite widely depending on the choice of the vinyl benzyl ether, the water solubilizing monomer (i.e. the particular water solubilizing group) and of any optional additional monomers, but can be readily determined by a skilled worker based on the known properties of the monomers and with routine evaluation.

Vinyl benzyl ether monomers have the formula

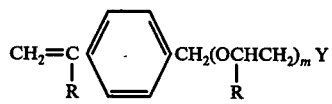

where R, $m$ and Y are as previously described. While the number of oxyalkylene groups

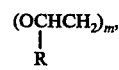

may vary from 10 to about 100, preferably the number of oxyalkylene groups is at least 20 to 40. The oxyalkylene groups may be a mixture of oxyethylene and oxypropylene groups, either heteric or block, but it is preferred that all such groups be oxyethylene groups.

The nature of the linking groups between the oxyalkylene chain and the hydrophobic group are not considered significant, since they are all hydrophilic groups.

The linking group is more dependent merely on the reactants employed to provide the hydrophobic group. An ethoxylated fatty acid introduces the

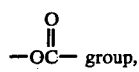

an ethoxylated nonyl phenol or fatty alcohol the —O— group, an ethoxylated mercaptan the —S— group, an ethoxylated fatty amide the

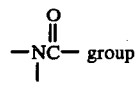

or an ethoxylated fatty amine the

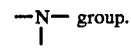

Nonionic surfactants of the above type and their preparation are fully described in "Nonionic Surfactants," Vol. 1, edited by M. J. Schick, published by Marcel Decker, Inc., New York, 1967.

$R_1$ may be an alkyl, aralkyl or alkaryl hydrophobic group having from 10 to 22 carbon atoms. Typical $R_1$ groups include lauryl, myristyl, cetyl, stearyl, oleyl, linoleyl, 2-phenyl decyl, octyl phenyl, decyl phenyl, dodecyl phenyl and the like. The $R_1$ groups are normally provided by the alkoxylated derivatives of alkyl phenols, fatty acids, fatty amides, fatty mercaptans, fatty alcohols or fatty amines which are reacted with vinyl benzyl chloride (or bromide) to prepare the monomer. $R_2$ includes methyl, ethyl butyl and like groups including those alkyl groups within the definition of $R_1$, above. $R_3$ is similar to $R_2$.

Preferably the vinyl benzyl ether monomer comprises from about 0.2 to 5 mole percent of the polymer and more preferably about 1 to 3 mole percent.

The vinyl benzyl ether monomers may be prepared according to the procedure described in U.S. Pat. No. 3,190,925. It is preferable to employ in the reaction alkoxylated hydrophobic materials which have little or no diol content to avoid formation of divinyl or polyvinyl monomers. The diol content may be minimized or eliminated by removing all traces of water from the reactants, solvents, etc. used in the condensation of the alkylene oxide with the hydrophobe (e.g. ethoxylation of nonyl phenol) and by preventing water of formation by using sodium metal as the catalyst in place of sodium hydroxide.

EXAMPLE 1

Preparation of a Vinyl Benzyl Ether Monomer.

Into a nitrogen purged stainless steel kettle was charged 1512 gms (0.727 mole) of an ethylene oxide condensation product of nonyl phenol having an average value for $m$ of about 40 (nonyl phenol/40 EO), 2415 gms of t-butyl alcohol as a solvent and 16.4 gms of sodium metal (0.715 mole). The contents of the kettle were heated at 100° C for 2 hours while the pressure rose from 0 to 50 psig and then leveled off. After cooling to room temperature, 107 gms of vinyl benzyl chloride (0.702 mole) was added, the kettle purged with nitrogen and the contents heated at 50°–65° C. After 3 ¾ hours a base titration showed 94% conversion to the vinyl benzyl ether monomer. The contents were allowed to react for an additional 2 hours at 50°–55° C and then neutralized to pH 6-7 with 2.85 gms of 95% acetic acid.

The alcohol solvent was removed by distillation until the kettle temperature was 80° C and the pressure 20 mm Hg. One gallon of benzene was added and then 1 quart distilled off to remove traces of alcohol. The slurry was filtered at 175 mm Hg and 50° C to remove NaCl and sodium acetate salts. The remaining benzene was removed by distillation at 80° C and 20 mm Hg. The waxy solid product had a melting point of 35°–40° C and weighed 1530 gms. Bromide/bromate titration in methanol gave an equivalent weight of 2180 gms/mole of unsaturation.

t-Butyl alcohol is a preferred solvent because it results in good reaction rates and yields. The reaction should be maintained below about 65° C to prevent polymerization in the strongly basic medium. Since the salts are partially soluble in the alcohol, it is replaced by benzene prior to filtration. The salts are undesirable because they are detrimental to polymerization. Benzene is a preferred recovery solvent because it dissolves the product, doesn't dissolve the salts and is low boiling and readily removed.

Following the procedure of example 1, vinyl benzyl ether monomers were prepared in which R was hydrogen, Y was —$OR_1$ and $R_1$ and m were as follows.

|   | $R_1$ | m |
|---|---|---|
| A | n-decyl | 40 |
| B | n-dodecyl | 40 |
| C | n-octadecyl | 7 |
| D | " | 20 |
| E | " | 40 |
| F | nonyl phenyl | 10 |
| G | " | 20 |
| H | " | 40 |

Water solubilizing monomers include acrylic acid, methacrylic acid and the like; sodium styrene sulfonate, sulfoethyl methacrylate

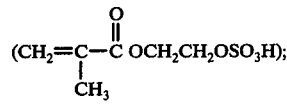

hydroxyalkyl acrylates and methacrylates wherein the alkyl group preferably has from 2-4 carbon atoms but may have more; dicarboxylic acids or their anhydrides such as maleic anhydride, itaconic anhydride, citraconic anhydride, chloromaleic anhydride, fumaric acid, maleic acid, itaconic acid and the like or the half ester or half amides of said acids. Monomers such as vinyl acetate may be used since the polymer may be hydrolyzed to produce the alchohol group.

Copolymerizable monomers which may be optionally used include alkenyl aromatic monomers, olefinic monomers, diesters of unsaturated dicarboxylic acids, vinyl ethers, vinyl esters, alkyl esters of acrylic and methacrylic acid and the like. Typical of such monomers are α-methyl styrene, vinyl toluene, ethylene, propylene, vinyl methyl ether, vinyl ethyl ether, vinyl acetate, vinyl benzoate, ethyl acrylate, methyl methacrylate, cyclohexyl acrylate, 2-ethyl hexyl methacrylate, diethyl maleate, dibutyl fumarate and the like. Certain monomers having reactive groups which might interact with the water solubilizing groups should be avoided. A skilled worker would know to do that.

The copolymers of this invention by virtue of the presence of the vinyl benzyl ether monomers already described are excellent thickening agents which are storage stable in contrast to many other available thickeners such as the esters of anhydride copolymers. Consequently, they are useful in thickening latex paints, in drilling muds, as thickeners in secondary oil recovery, gelling agents for cosmetics and the like.

The invention may be further illustrated, but not limited to, by the following examples which show the preparation of a terpolymer of styrene, maleic anhydride and the vinyl benzyl ether of nonylphenoxy (ethyleneoxy)$_{40}$ ethanol (abbreviated as nonyl phenol/40 EO).

EXAMPLE 2

In a 500 ml flask equipped with mechanical agitation, a condenser, thermometer, N$_2$ inlet tube and an external heating bath was added 100 ml of toluene, 9.8 gms (0.1 mole) maleic anhydride and 11.3 gms (0.005 mole) of vinyl benzyl ether of nonyl phenol/40 EO (eq. wt. per double bond, 2260). The mixture was stirred to form a clear solution. Then 9.88 gm (0.095 mole) of styrene and 0.0098 gm of azobisisobutyronitrile catalyst was added. The polymerization was conducted at 90° C for 3 hours. Onset of polymerization was indicated by an initial slight development of turbidity at 88° C. The resulting product was a slightly viscous translucent dispersion. The mixture was cooled and devolatilized under vacuum at 80° C to remove the solvent. Polymer product yield was 31.58 gms. The polymer had an inherent viscosity in acetone at 25° C of 0.41 and a 10% solution viscosity in methyl ethyl ketone (MEK) at 25° C of 6.36 cps.

A 5% sodium salt solution of the polymer was made by dispersing it in water and neutralizing with NaOH (1.75 moles NaOH/mole of anhydride). The clear solution had a Brookfield viscosity of 7700 cps (#5 spindle, 20 rpm. 25° C).

EXAMPLE 3

Example 2 was repeated except the solvent was replaced by 67 gms of MEK. The solution of monomers and catalysts was heated at 80° C for 4 hours with stirring in a N$_2$ atmosphere. A clear viscous solution was produced which was devolatilized under vacuum at 80° C. Recovered polymer weight was 30.87 gms; inherent viscosity — 0.337; solution viscosity — 3.06 cps and a 5% sodium salt solution had a Brookfield viscosity of 4500 cps.

EXAMPLE 4

Copolymers similar to example 2 and 3 were made at varying conditions of polymerizations. The monomers and catalyst were the same as previously used and viscosities determined as before. The results are reported in Table I.

TABLE I

| | S grams | Monomers MA grams | VBE grams | Solvent grams | Vazo catalyst grams | Temp. of polymerization | Yield* of polymer | $\eta$inh | $\eta$10% MEK cps | 5% Na Salt of polymer soln. Viscosity-cps |
|---|---|---|---|---|---|---|---|---|---|---|
| (a) | 9.88 | 9.8 | 10.8 | Toluene 100 | 0.05 | 110°/3 hrs | 29.59 | 0.238 | 2.89 | 1200 |
| (b) | 9.88 | 9.8 | 11.65 | MEK 114.4 | 0.098 | 30°/4 hrs | 30.85 | 0.29 | 2.3 | 1240 |
| (c) | 9.88 | 9.8 | 11.65 | 67 | 0.098 | 80°/4 hrs | 30.87 | 0.337 | 3.06 | 4500 |
| (d) | 9.8 | 9.8 | 10 | Toluene 100 | 0.1 | 105°/3 hrs | 31.2 | — | — | 2700 |
| (d) | 9.88 | 9.8 | 11.3 | 100 | 0.005 | 90°/3 hrs | 31.58 | 0.41 | 6.36 | 7700 |
| (f) | 10.4 | 9.8 | — | 100 | 0.1 | 105°/3 hrs | | | | |

*Yield in grams.

Terpolymers of the previous examples can be prepared from other alkenyl aromatic monomers than styrene or mixtures thereof with styrene. Likewise maleic anhydride may be replaced by any of the anhydrides previously mentioned or mixtures thereof. Various vinyl benzyl ether monomers may also be used. The mole ratios in the terpolymer of the anhydride/aromatic monomer/vinyl benzyl ether may vary from 1/0.75/0.25 to 1/2.99/0.01, respectively. Terpolymers with styrene and maleic anhydride are preferred. The above described terpolymers are excellent thickening agents for latex paints.

U.S. Pat. Nos. 2,921,930 and 3,301,829 propose to modify a styrene-maleic anhydride copolymer by reaction with various nonionic surfactant alcohols to improve their thickening action. Following the methods of these patents it has been found that crosslinked products are obtained. It is known that crosslinked polymers give viscous solutions. One can make products under controlled conditions which give smooth viscous solutions, however, the viscosity, on aging, is not stable. To compare these products with the products of this invention the following example is presented.

EXAMPLE 5

An equal molar copolymer of styrene-maleic anhydride (10% MEK viscosity, 8 cps) was esterfied according to U.S. Pat. No. 2,921,930 with 2.5 mole percent of a nonionic surfactant (nonyl phenol/40 EO) in MEK solvent. The polymeric ester was devolatilized and dissolved in water by neutralizing it with NaOH. Five weight percent sodium salt solutions of the above polymer and a copolymer of this invention (copolymer of Example 4,d) were compared.

Viscosity Stability at 70° C

| Time in Hours | Example 4d (this invention) | Example 5 (prior art) |
|---|---|---|
| 0 | 2700 cps | 4800 cps |
| 24 | 2250 | 950 |
| 48 | 2100 | 400 |
| 120 | 2000 | 60 |
| 144 | 2000 | — |

While the prior art had an initial higher viscosity, the viscosity rapidly decreased with time. The viscosity stability of the copolymers of this invention is dramatically evident.

The copolymers of this invention may be conveniently prepared, as previously illustrated, or by any of the other methods well known to polymer chemists. Aromatic solvents, chlorinated aromatic and aliphatic solvents, tetrahydrofuran, dimethyl formamide, dimethyl sulfoxide, ketone solvents and the like may be used. Any convenient concentration of monomers in the solvents may be used such as 10 to 60 weight percent but generally a concentration of about 20 to 40 percent is used. The temperature may also vary considerably, but normally is about 40° to 110° C. Lower temperatures generally produce higher molecular weights and vice versa. The polymerization may be run under pressure but in most instances is not necessary. Catalyst concentrations usually range from about 0.001 to 2 weight percent based on the monomers. An inert atmosphere such as $N_2$, $CO_2$, and the like is usually employed in the polymerization. Peroxide and other free radical generating catalysts are conveniently used.

EXAMPLE 6

Additional vinyl benzyl ether monomers may be prepared according to example 1 from the following nonionic surfactants.

A dodecylphenoxy (ethyleneoxy)$_{14}$ ethanol
B tridecyloxy (ethyleneoxy)$_{14}$ ethanol
C stearyloxy (ethyleneoxy)$_{19}$ ethanol
D lauryloxy (ethyleneoxy)$_{19}$ ethanol
E Dodecylmercapto (ethyleneoxy)$_9$ ethanol
F t-alkyl ($C_{18}$-$C_{22}$) amino (ethyleneoxy)$_{24}$ ethanol
G dialkylamino (ethyleneoxy)$_{40}$ ethanol
H N-methylstearamido (ethyleneoxy)$_{40}$ ethanol
I N-ethyllauramido (ethyleneoxy)$_{30}$ ethanol
J octadecylmercapto (ethyleneoxy)$_{60}$ ethanol
K N-methyl-N-dodecylamino (ethyleneoxy)$_{40}$ ethanol
L oleyloxy (ethyleneoxy)$_{35}$ ethanol
M N,N-dioctylamino (ethyleneoxy)$_{25}$ ethanol
N hexadecylmercapto (ethyleneoxy)$_{45}$ ethanol

EXAMPLE 7

Using the vinyl benzyl ether monomers of examples 1 and 6 additional polymers within the scope of this invention are summarized below.

| A VBE Monomer* | B Solubilizing Monomer | C Optional Monomer | Mole Ratio A:B:C |
|---|---|---|---|
| 1,F | acrylic acid | styrene | .02/.5/.48 |
| 1,H | " | " | .01/.5/.49 |
| " | " | butyl acrylate | .01/.6/.39 |
| " | " | methyl methacrylate | .02/.6/.38 |
| 1,G | " | styrene | .02/.5/.48 |
| 1,B | ethyl acid maleate | " | .02/.5/.48 |
| 1,H | " | " | .02/.5/.48 |
| " | ethyl acid fumarate | " | .02/.5/.48 |
| " | hydroxyethyl acrylate | — | .01/.99/— |
| " | sodium styrene sulfonate | — | .02/.98/— |
| " | sulfoethyl methacrylate | — | .02/.98/— |
| " | aminoethyl methacrylate | — | .01/.99/— |
| " | methacrylic acid | — | .01/.99/— |
| " | maleic anhydride | isobutylene | .01/.5/.49 |
| " | " | vinyl methyl ether | .01/.5/.49 |
| " | " | vinyl toluene | .02/.5/.48 |
| 6,B | " | styrene | .01/.5/.49 |
| 6,C | " | " | .01/.5/.49 |
| " | acrylic acid | " | .01/15/.49 |
| 6,E | maleic anhydride | " | .01/.5/.49 |
| 6,J | " | " | .01/.5/.49 |
| 6,H | " | " | .01/.5/.49 |
| 6,F | " | " | .01/.5/.49 |
| 1,H | vinyl pyrrolidone | | .01/.5/.49 |

-continued

| A VBE Monomer* | B Solubilizing Monomer | C Optional Monomer | Mole Ratio A:B:C |
|---|---|---|---|
| " | itaconic acid | " | .01/.5/.49 |

*Number refers to example number and the letter refers to the monomer of that letter in the example

EXAMPLE 8

An acrylic latex (Rhoplex AC 35) was formulated into a paint as follows:

| Pigment Grind | lbs/100 gals. |
|---|---|
| Water | 125 |
| Dispersant (Tamol 731) | 8 |
| Polypropylene glycol (1200 M.W.) | 8 |
| Preservative | 2 |
| Titanium Dioxide | 200 |
| $CaCO_3$ | 257 |
| Ethylene glycol | 15 |
| Surfactant (Triton X-100) | 5 |
| Paint Let Down | |
| Rhoplex AC35 (46% solids) | 387 |

Storage stability tests were made with the above paint thickened with a copolymer of this invention similar to polymer (e) in Table I and a styrene-maleic anhydride ester similar to the one of example 5 except 5 mole percent of nonionic surfactant was esterified rather than 2.5 mole percent.

| | SMA ester | VBE polymer |
|---|---|---|
| Lbs. thickener/100 gal. | 4 | 4 |
| Paint Viscosity, K.U. | 106 | 105 |
| Viscosity after aging at 120° F | | |
| 1 week | 102 | 109 |
| 2 weeks | 90 | 108 |
| 3 weeks | 84 | 107 |
| 4 weeks | 76 | 107 |

What is claimed is:
1. A polymer comprising
(a) about 0.2 to 15 mole percent of a vinyl benzyl ether monomer having the formula

$$CH_2=\underset{R}{C}-\!\!\!\left\langle\!\!\!\bigcirc\!\!\!\right\rangle\!\!\!-CH_2(OCHCH_2)_m Y$$
$$\phantom{CH_2=C-\bigcirc-CH_2(OCH}R$$

wherein R is hydrogen or methyl, m is about 10 to 100 and Y is $-SR_1$, $$-\underset{R_3}{NR_2},\ -O\overset{O}{\overset{\|}{C}}R_1\ \text{or}\ -N\overset{O}{\overset{\|}{C}}R_2$$
$$\phantom{-NR_2,\ -OCR_1\ \text{or}\ -}R_3$$

where $R_1$ is an alkyl, aralkyl or alkaryl hydrophobic group of 10 to about 22 carbon atoms, $R_2$ is an alkyl group of 1 to about 22 carbon atoms and $R_3$ is hydrogen or an alkyl group of 1 to about 22 carbon atoms, provided $R_2$ and $R_3$ in combination have at least 10 carbon atoms.
(b) the balance to make 100 mole percent of one or more copolymerizable ethylenically unsaturated monomers provided a water solubilizing amount of at least one monomer having a carboxylic acid group, an anhydride group, a sulfate group, a sulfonate group or a hydroxyl group is present.

2. The polymer of claim 1 wherein $m$ is 10 to about 40.

3. The polymer of claim 1 wherein the mole percent of said ether monomer is about 0.2 to 5 percent.

4. The polymer of claim 1 wherein the mole percent of said ether monomer ranges from about 1 to 3 percent.

5. The polymer of claim 1 wherein the oxyalkylene group is oxyethylene.

6. The polymer of claim 5 wherein $m$ is 10 to about 40.

7. The polymer of claim 5 wherein the mole percent of said ether monomer is about 0.2 to 5 percent.

8. The polymer of claim 5 wherein the mole percent of said ether monomer ranges from about 1 to 3 percent.

* * * * *

UNITED STATES PATENT AND TRADEMARK OFFICE
CERTIFICATE OF CORRECTION

PATENT NO. : 4,105,649
DATED : Aug. 8, 1978
INVENTOR(S) : Syamalarao Evani; Frederick P. Corson It is certified that error appears in the above-identified patent and that said Letters Patent are hereby corrected as shown below:

Column 2, line 2, delete "compolymer" and insert --copolymer--

Column 4, line 57, delete "alchohol" and insert --alcohol--

Column 6, in the table, sixth column, delete "30°" and insert --80°--

Column 7, in Example 7, line 64, delete "15" and insert --.5--

Signed and Sealed this

Third Day of April 1979

[SEAL]

Attest:

RUTH C. MASON
Attesting Officer

DONALD W. BANNER
Commissioner of Patents and Trademarks